(12) United States Patent
Kim et al.

(10) Patent No.: US 7,055,135 B2
(45) Date of Patent: May 30, 2006

(54) METHOD FOR DEBUGGING AN INTEGRATED CIRCUIT

(75) Inventors: Hong S. Kim, Austin, TX (US); Amit Majumdar, San Jose, CA (US); Sridhar Narayanan, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 611 days.

(21) Appl. No.: 10/139,568

(22) Filed: May 6, 2002

(65) Prior Publication Data

US 2003/0208747 A1    Nov. 6, 2003

(51) Int. Cl.
 *G06F 9/44* (2006.01)
(52) U.S. Cl. ...................................... 717/124
(58) Field of Classification Search ................ 717/124, 717/131; 714/726, 718, 738
See application file for complete search history.

(56) References Cited

U.S. PATENT DOCUMENTS

| | | | | |
|---|---|---|---|---|
| 4,646,299 A | * | 2/1987 | Schinabeck et al. | 714/736 |
| 5,633,813 A | * | 5/1997 | Srinivasan | 703/14 |
| 5,771,240 A | * | 6/1998 | Tobin et al. | 714/724 |
| 5,802,075 A | * | 9/1998 | Carpenter et al. | 714/738 |
| 5,937,190 A | * | 8/1999 | Gregory et al. | 717/131 |
| 6,026,220 A | * | 2/2000 | Cleereman et al. | 703/23 |
| 6,212,667 B1 | * | 4/2001 | Geer et al. | 716/6 |
| 6,687,865 B1 | * | 2/2004 | Dervisoglu et al. | 714/726 |
| 6,851,095 B1 | * | 2/2005 | Srinivasan et al. | 716/4 |
| 2002/0138801 A1 | * | 9/2002 | Wang et al. | 714/729 |

OTHER PUBLICATIONS

Blyzniuk, Mykola; Kazymyra, Irena; "Development of the Special Software Tools for the Defect/Fault Analysis in the Complex Gates from Standard Cell Library", 2001 IEEE, retrieved Mar. 17, 2005.*

(Continued)

*Primary Examiner*—Wei Y. Zhen
*Assistant Examiner*—Mary Steelman
(74) *Attorney, Agent, or Firm*—Zagorin O'Brien Graham LLP (57) ABSTRACT

Embodiments of the present invention provide a method and apparatus for debugging an integrated circuit. In particular, one embodiment of the present invention includes steps of: (a) retrieving data from a design data base, and creating a design pattern in a pattern format, which design pattern includes stimulus data for stimuli to be applied to the integrated circuit and design response data for expected responses to the stimuli; (b) generating, responsive to the design pattern, a tester pattern and a test program for input to a tester; (c) testing the integrated circuit in the tester, responsive to the tester pattern and the test program, and generating a datalog that comprises test response data; and (d) generating a file, responsive to the datalog, wherein the test response data are reformatted into the pattern format.

17 Claims, 7 Drawing Sheets

OTHER PUBLICATIONS

Jone, Wen-Ben; Papachristou, CA; "A Coordinated Approach to Partitioning and Test Pattern Generation for Pseudoexhaustive Testing", p. 525-530, 1989 ACM retrieved Mar. 17, 2005.*

Schneider, A; Ivask, E; Miklos, P; Raik, J; Diener, KH; Ubar, R; Cibakova, T; Gramatove, E; "Internet-based Collaborative Test Generation with MOSCITO", 2002 IEEE, retrieved Mar. 17, 2005.*

Shen, John Paul, "Highlights of CMU Research on CAD, CAM, and CAT of VLSI Circuits", p. 878-889, 1986 IEEE retrieved Mar. 17, 2005.*

* cited by examiner

EXAMPLE OF DATALOG FILE

TYPICAL FORMAT:

FAIL LOCATION 1:
   LIST OF FAILPINS   FAIL SEQ. LOGIC VALUES   EXPECTED SEQ. LOGIC VALUES
   ...

FAIL LOCATION 3:
   LIST OF FAILPINS   FAIL SEQ. LOGIC VALUES   EXPECTED SEQ. LOGIC VALUES
   ...

FAIL LOCATION N:
   LIST OF FAILPINS   FAIL SEQ. LOGIC VALUES   EXPECTED SEQ. LOGIC VALUES
   ...

METHOD FOR DEBUGGING AN INTEGRATED CIRCUIT

TECHNICAL FIELD OF THE INVENTION

The present invention pertains to method and apparatus for debugging an integrated circuit.

BACKGROUND OF THE INVENTION

Integrated circuits (sometimes referred to as "silicon" by design engineers) contain an ever increasing number of devices that provide an ever increasing amount of functionality. As a result, it is becoming an ever more important, and time consuming, task to determine whether an integrated circuit performs as intended, i.e., in conformance with its design. To do this, design engineers have test engineers test the integrated circuit's response to a number of predetermined stimuli to verify that the integrated circuit will provide predetermined results. For example and without limitation, functional tests are performed wherein predetermined patterns of data are presented to predetermined inputs of the integrated circuit in predetermined time sequences, and outputs are measured at predetermined time sequences. The results of these tests are examined to verify and debug the design of the integrated circuit, i.e., to determine whether the integrated circuit operates satisfactorily.

Figure 1:
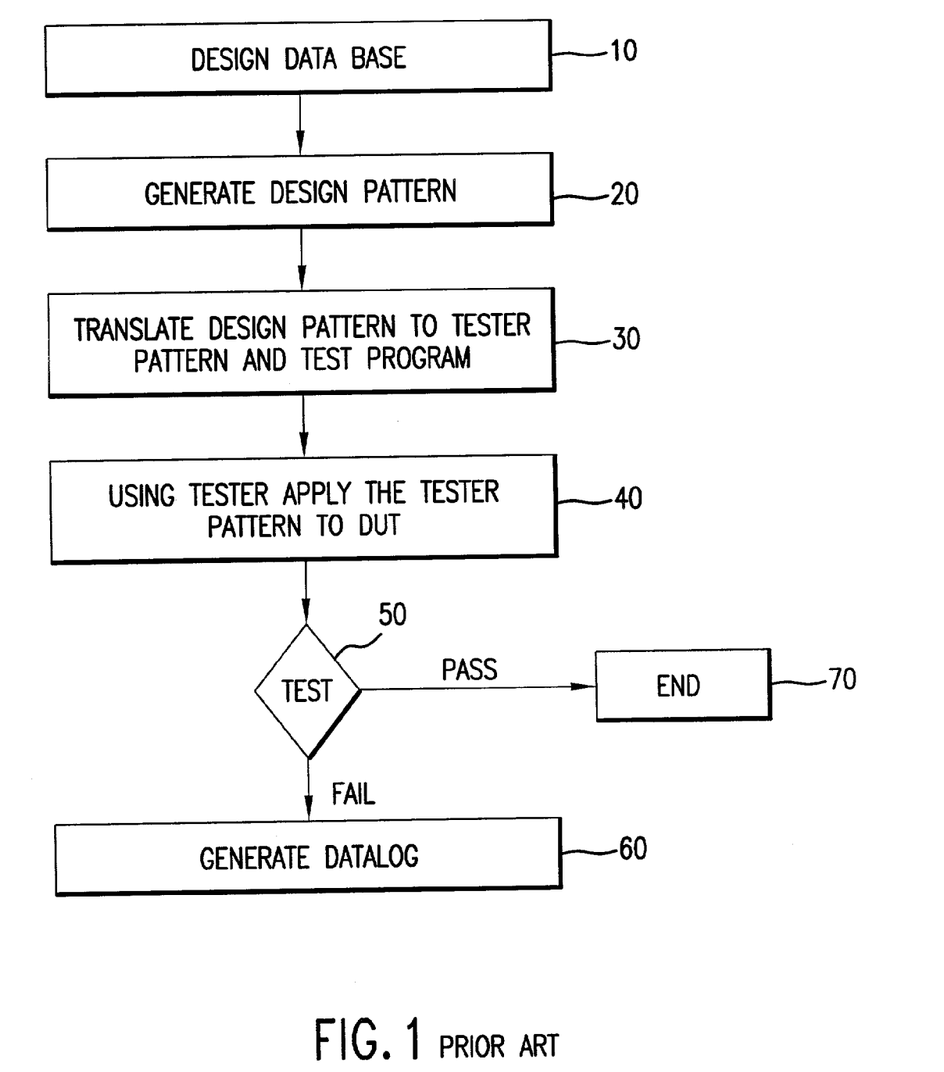
FIG. 1 illustrates steps involved in debugging an integrated circuit in accordance with the prior art.

Referring to FIG. 1, a debugging scheme in accordance with the prior art is shown that facilitates determining whether the integrated circuit operates satisfactorily, i.e., in accordance with design criteria. To that end, a software application running on a suitable computer system uses design data base 10 corresponding to the integrated circuit to generate an output file (referred to herein as a "design pattern") by running a simulation at step 20. At step 30 of FIG. 1, the design pattern is provided as input to a translator and test program generator to translate the design pattern to a tester pattern, and to generate a test program used by a tester. At step 40 the tester applies the tester pattern to the integrated circuit, referred to as a device under test "DUT". To that end, the integrated circuit is mounted to the tester, and the test program, generated at step 30, is loaded into the tester. Next, as indicated by decision box 50, the results of each test performed on the DUT by the tester are evaluated. If any test is failed, as indicated at step 60 of FIG. 1, the results of the failure are stored in an output file referred to as a datalog. Otherwise, debugging ends at step 70.

Figure 2:
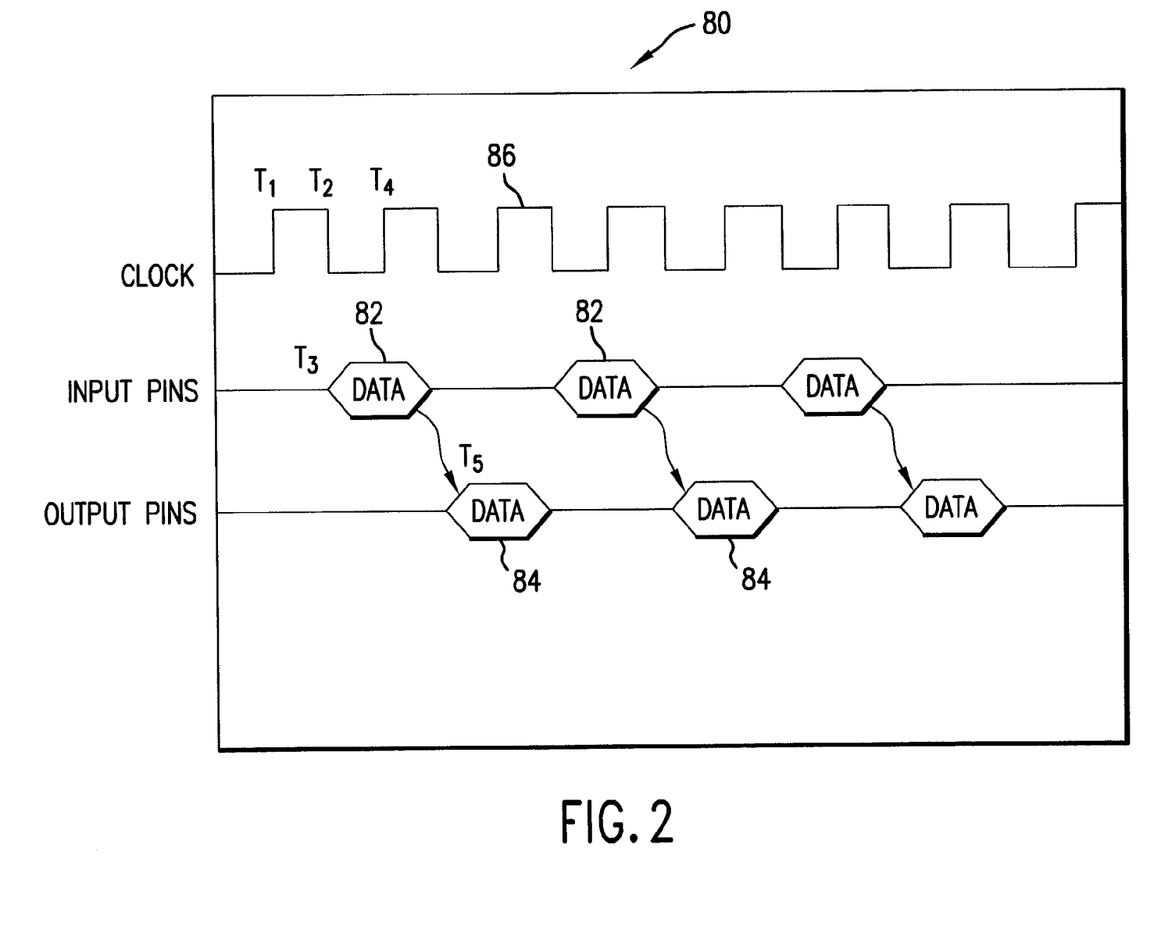
FIG. 2 shows a graphical representation of a portion of a value-change-dump ("VCD") format design pattern for a proposed test of an integrated circuit.

FIG. 2 shows an exemplary design pattern 80 generated at step 20 of FIG. 1 and includes input data 82, output data 84, and clock signal 86. Input data 82 is stimuli applied to the integrated circuit by the tester. Output data 84 are simulated responses, which are to be expected if the integrated circuit were to operate in conformance with design parameters. For example, a typical such design pattern (or stimulus-response file) comprises logic values to apply to various pins of the integrated circuit (for example, high or low values) at various times. Further, a typical such design pattern (or stimulus-response file) also comprises logic values expected to be observed at various pins of the integrated circuit (for example, high or low values) at various times if the integrated circuit were to operate in conformance with its design. In the prior art, a typical such design pattern (or stimulus-response file) is formatted in a file that is sometimes referred to as a value change dump ("VCD") file. As is known, in one embodiment in the prior art, a VCD file is an ASCII file that contains header information (for example, a data, a simulation software version number used to produce the file, and a timescale used), variable definitions (for example, definitions of the scope and type of variables in the file), and value changes for the variables (i.e., information about value changes on selected signals and time entries every time there is a state change on a pin). Typically, the simulation times recorded in the VCD file is an absolute value of the simulation time for changes in variable values that follow. Clock signal 86 includes a predetermined number of cycles to account for "real time" events taken into account to test the integrated circuit.

Figure 3:
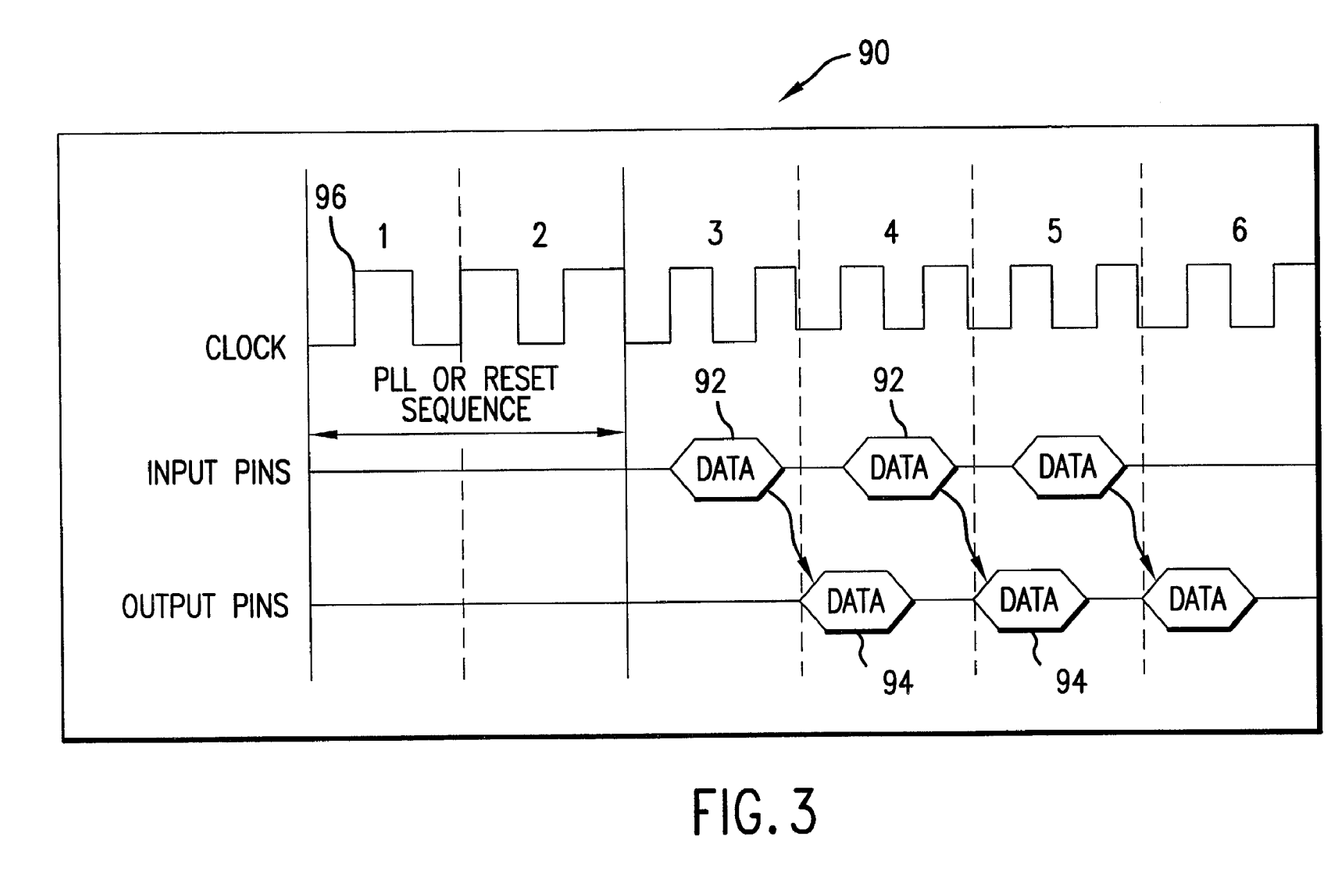
FIG. 3 is a graphical representation of a portion of a tester pattern generated using the design pattern shown in FIG. 2.

FIG. 3 shows an exemplary test pattern 90 generated at step 30 of FIG. 1 and includes input data 92, output data 94, and clock signal 96. Clock signal 96 includes a predetermined number of cycles to account for "real time" events taken into account to test the integrated circuit. Examples of "real time" events include the time required, for example, for a phase-locked loop to stabilize and/or the time required for a predetermined reset sequence to be carried out. In practice, the translator may be part of a test program generator that generates the test program that will be executed by the tester. The test program typically includes a data base of external signals and their type (thereby determining what tests need to be performed), and appropriate executable program code for the tester. For example, step 30 is performed to translate "event-driven" vectors of the VCD file to "cycle-based" vectors used by testers (this step is sometimes referred to as "cyclization"). For example, in a cycle-based vector format, there is only a single vector entry for each clock cycle (assuming a synchronous system), whereas event-driven vectors typically have numerous vector entries for each cycle indicating time-positioning of all of the transition edges for signals in the file throughout a simulation run. The translation process is performed under user control (many computer programs exist for translating VCD files into a format that is useable by a tester). Typically, the translator is configured, for example, by a test engineer, with what is sometimes referred to as a recipe file. The recipe file may specify: (a) which pins in the VCD file are input pins and which are output pins; (b) how to map state characters between the two format; (c) how to deal with bi-directional data; (d) perhaps some desired signal masking; (e) particular frequencies at which to perform particular tests; (f) desired tester program output format; and (g) so forth.

Figure 4:
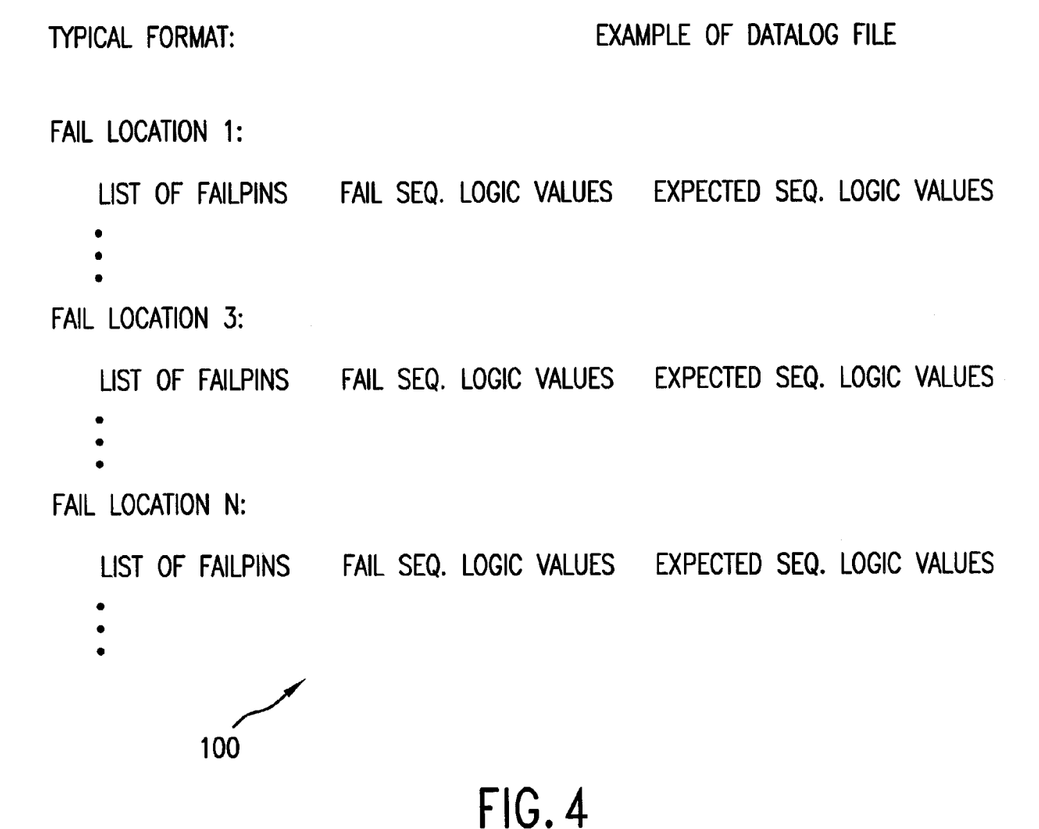
FIG. 4 is a representation of a portion of a datalog file that is output from a tester in response to testing an integrated circuit using the tester pattern shown in FIG. 3.

FIG. 4 shows an exemplary portion of a datalog 100 generated at step 60 of FIG. 1. Datalog 100 includes information concerning the "FailLocation n" which indicates the identity of the "failure location." This may be specified, for example, by associating a clock cycle number during which a failure occurred. Further, for each failure location, there is a list of: (a) failed pins, (b) fail seq. logic values (i.e., the measured logic values for the pins associated with the failure indication), and (c) expected seq. logic values (i.e., the expected logic values for the pins associated with the failure indication had the circuit operated in conformance with its design).

Although datalog 100 contains a record of the DUT's performance on each test, it is difficult for a design engineer to analyze the datalog. The difficulty arises because datalog 100 is typically provided in a format that relates to that of the tester rather than a format that relates to that of the design pattern that the design engineer is used to reviewing. In particular, due to cyclization, it is not readily apparent to the design engineer how a clock cycle in datalog 100 relates to a particular time in the design pattern. Further, due to cyclization, logical signals in the tester pattern, and hence datalog 100, very often have no relationship to logical signals in the tester pattern. Further, datalog 100 often includes symbols for logical signals that are not familiar to the design engineer.

All of the above presents a problem because design engineers are not readily able to compare the design pattern with datalog 100. As a result, design engineers who debug circuit designs must spend many hours with test engineers just to understand the nature of the problem. In fact, and in practice, even after spending many hours with test engineers, design engineers have difficulty correlating datalog 100, shown in FIG. 4, with design pattern 80, shown in FIG. 2, and therefore debugging the design of the integrated circuit. This problem is exacerbated by the fact that many different tester formats are used. Thus, even when the data contained in datalog 100 is printed on paper, and an operator compares the printout with a corresponding printout of responses generated in accordance with design requirements to determine whether the integrated circuit operated in conformance with its design, this is a slow, cumbersome process that is prone to human error.

In light of the above, there is a need in the art for method and apparatus for solving the above-identified problem.

SUMMARY OF THE INVENTION

One or more embodiments of the present invention advantageously satisfy the above-identified need in the art. Specifically, one embodiment of the present invention is a method for debugging an integrated circuit comprising steps of: (a) retrieving data from a design data base, and creating a design pattern in a pattern format, which design pattern includes stimulus data for stimuli to be applied to the integrated circuit and design response data for expected responses to the stimuli; (b) generating, responsive to the design pattern, a tester pattern and a test program for input to a tester; (c) testing the integrated circuit in the tester, responsive to the tester pattern and the test program, and generating a datalog that comprises test response data; and (d) generating a file, responsive to the datalog, wherein the test response data are reformatted into the pattern format.

DETAILED DESCRIPTION

Figure 5:
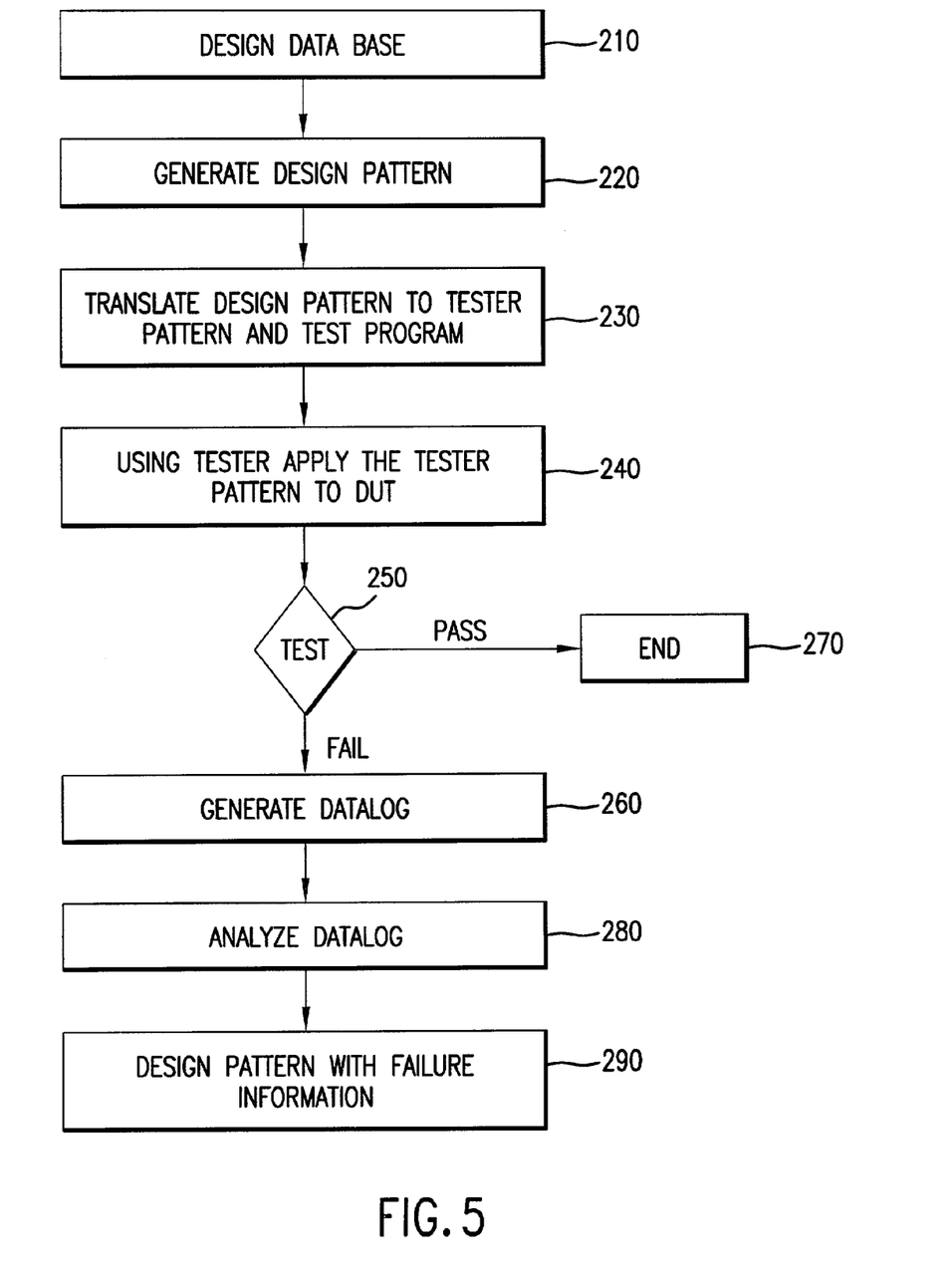
FIG. 5 is a flowchart of one embodiment of a method for debugging an integrated circuit in accordance with the present invention, i.e., a method for determining whether the integrated circuit operates in conformance with its design requirements.

FIG. 5 is a flowchart of one embodiment of a method for debugging an integrated circuit in accordance with the present invention, i.e., a method for determining whether the integrated circuit operates in conformance with its design requirements. As shown in FIG. 5, steps 210, 220, 230, 240, 250, 260 and 270 are identical to steps 20, 30, 40, 50, 60 and 70, shown in FIG. 1. Referring to both FIGS. 5 and 6, at step 280 a debug file generator 300 receives datalog 100, and optionally, design pattern 80 as input. Debug file generator 300 generates a debug file 400, discussed more fully below with respect to FIG. 7, that comprises a design pattern and failure information at step 290, shown in FIG. 5. The failure information is in the format of the design pattern, i.e., pattern format.

Figure 6:
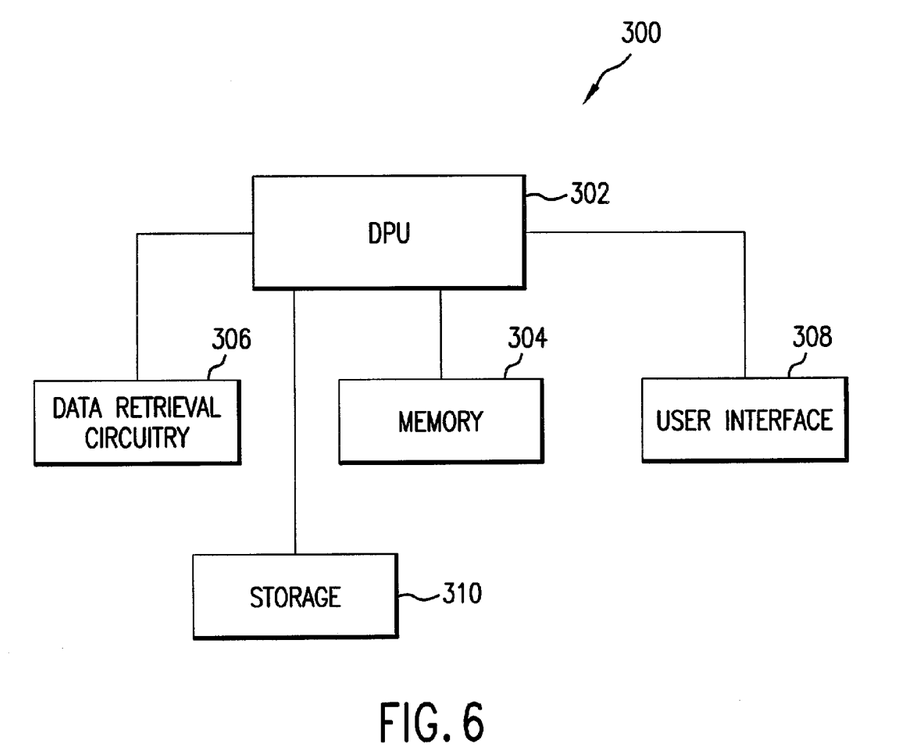
FIG. 6 is a block diagram of a debug file generator that runs a debug file generator program in accordance with one embodiment of the present invention.

FIG. 6 shows an embodiment of debug file generator 300 that runs a debug file generator application in accordance with one embodiment of the present invention. In accordance with this embodiment of the present invention, debug file generator 300 comprises data processing unit (DPU) 302 in connection with memory 304, data retrieval circuitry 306, and user interface 308. Data retrieval circuitry 306 retrieves data from datalog 100, shown in FIG. 4, and optionally from design pattern 80 shown in FIG. 2. In accordance with one embodiment of the present invention, datalog 100 generated by the tester, and optionally, design pattern 80, is/are stored in data structures accessible by debug file generator 300. The exact form of the data structures for storing datalog 100, and optionally, design pattern 80 are not critical, and may be generated in accordance with any one of a number of methods that are well known to those of ordinary skill in the art. Datalog 100, and optionally design pattern 80, may be obtained in accordance with any one of a number of methods that are well known to those of ordinary skill in the art depending on actual computer components used. For example, in accordance with one embodiment of the present invention, datalog 100, and optionally design pattern 80, is supplied to debug file generator 300 as a file stored on a magnetic disk. In accordance with an alternative embodiment of the present invention, datalog 100, and optionally design pattern 80, is supplied to debug file generator 300 by computer communications using an interface such as an RS-232 interface or an Ethernet interface. In accordance with yet a further embodiment of the present invention, debug file generator 300 shares a common data processing unit with a computer used to generate design pattern 80, and thus, design pattern 80 is supplied to debug file generator 300 via an internal data base. Once data retrieval circuitry 306 has retrieved the data from datalog 100, and optionally design pattern 80, it is accessed by DPU 302.

Referring to FIGS. 2, 4, 6 and 7, a portion of debug file 400 is shown. Debug file 400 is generated, in accordance with one embodiment of the present invention, by debug file generator 300 employing design pattern file 80 as input. To that end, as the first logical operation, debug file generator 300 converts data 82 and 84 into data 402 and 404, respectively. To do this, debug file generator 300 searches datalog 100, and collects all data relating to a particular integrated circuit pin identified therein. For example, this means collecting data for the particular pin at each "FailureLocation" indicated in datalog 100. Then, debug file generator 300 converts the fail logic values from a "cyclization" format of the tester to a format of design pattern 80, i.e., design format. As one can readily appreciate, debug file generator 300 may collect the data for all pins in datalog 100 before converting the data to the design pattern format. Alternatively, debug file generator 300 may collect and convert the data separately for each pin identified in datalog 100.

In order to convert the data, information may have to be supplied to debug file generator 300, for example, by the testing engineer who prepared tester pattern 90, shown in FIG. 3. Such information might include, for example, particular clock rates and data logic symbols used to create tester pattern 90. Finally, after the first logical operation, a file exists in the design pattern format for all (or for a predetermined number of) pins. In accordance with one embodiment of the present invention, the data for a pin is in the format of a signal, which may be labeled, for example, Fail Signal for pin-x.

As the second logical operation, debug file generator 300 combines design pattern 80 and the Fail Signals generated by the first logical operation. Thus, in accordance with one embodiment of the present invention, the second logical operation interleaves the Fail Signals with design pattern 80 to create debug file 400 wherein a Fail Signal 408 for a particular pin appears with the output signal from the design pattern for that pin. In accordance with a variation of this embodiment, instead of representing tester failure data, Fail Signal 408 is formatted to represent a failure indication, i.e., an indication where the expected output in the signal labeled "Output pin" from design pattern 80 was not achieved (refer to FIG. 7). In accordance with a further embodiment, there could be two Fail Signals, one comprising the tester failure data, and one comprising failure indications.

Advantageously, since debug file 400 is in the same format as the design pattern, it may be displayed using the same commercially available software that can be used to display design patterns.

In accordance with further embodiments of the present invention, the failure indications are not provided as separate Fail Signals, but are provided by highlighting, coloring, or otherwise marking data in the "Output pin" signals in the design pattern where failures occurred.

As can be readily appreciated, because testers manufactured by different manufacturers often produce datalogs having differing formats, it may be required to adjust debug file generator 300 accordingly. Debug file generator 300 then stores the debug file in memory 304 or in storage 310. In accordance with another embodiment of the present invention, debug file generator 300 has a user interface 308, including, for example, a keyboard and a display for allowing user access and control of debug file generator 300. Those of ordinary skill in the art will recognize that the exact computer equipment to be used is not critical, and a wide variety of computer platforms may be configured to function suitably as debug file generator 300.

Figure 7:
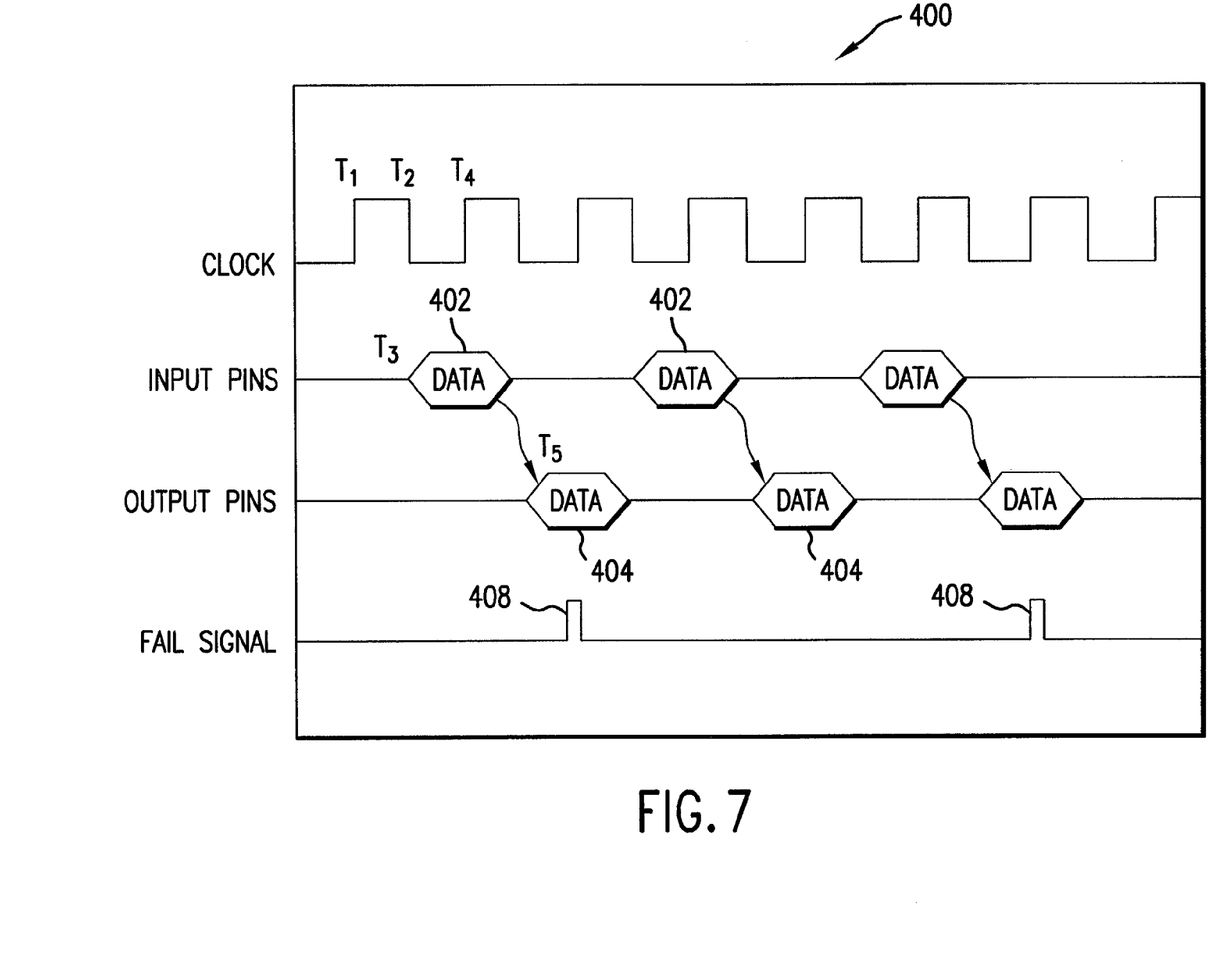
FIG. 7 shows a display of data from a portion of a debug file generated in accordance with one embodiment of the present invention.

As shown in FIG. 7, when a design engineer displays debug file 400, for example and without limitation, at a user display interface apparatus such as a computer monitor to identify failures, Fail Signal 408 indicates failure conditions where the actual response data at a particular pin does not match the design response data at the pin. Those of ordinary skill in the art will recognize that the exact computer equipment to be used is not critical, and a wide variety of computer platforms may be configured to function suitably to execute the filtered debug file generator program.

Those skilled in the art will recognize that the foregoing description has been presented for the sake of illustration and description only. As such, it is not intended to be exhaustive or to limit the invention to the precise form disclosed. For example, it is understood that different combinations of hardware may be used in constructing any of the computer based systems described herein, and that any of the computer based systems may comprise multiple computer platforms with separate DPUs or a single computer platform executing a software program as described herein.

What is claimed is:

1. A method for debugging an integrated circuit comprises steps of:
    retrieving data from a design data base, and creating a design pattern in a pattern format, which design pattern includes stimulus data for stimuli to be applied to the integrated circuit and design response data for expected responses to the stimuli;
    generating, responsive to the design pattern, a tester pattern and a test program for input to a tester;
    testing the integrated circuit in the tester, responsive to the tester pattern and the test program, and generating a datalog that comprises test response data; and
    generating a file, responsive to the datalog, wherein the test response data are reformatted into the pattern format.

2. The method of claim 1 wherein the step of generating a datalog comprises identifying the reformatted test response data as one or more failure signals comprising reformatted test response outputs for pins of the integrated circuit.

3. The method of claim 2 wherein the step of generating a datalog further comprises substituting failure indications for one or more of the reformatted test response outputs.

4. The method of claim 3 which further comprises, responsive to the design pattern and the file, combining the file and the design pattern to form a debug file.

5. The method of claim 3 which further comprises, responsive to the design pattern and the file, altering the design pattern to reformat design response data associated with failure indications.

6. The method of claim 2 wherein the step of generating a datalog further comprises generating one or more further failure signals comprising the failure signals having failure indications substituted for one or more of the reformatted test response outputs.

7. The method of claim 4 which further comprises, responsive to the design pattern and the file, combining the file and the design pattern to form a debug file.

8. A system for debugging an integrated circuit comprising:
    means for retrieving data from a design data base, and creating a design pattern in a pattern format, with the design pattern including stimulus data for stimuli to be applied to the integrated circuit and design response data for expected responses to the stimuli;
    means for generating, responsive to the design pattern, a tester pattern and a test program for input to a tester;
    means for testing the integrated circuit in the tester, responsive to the tester pattern and the test program, and generating a datalog that comprises test response data;
    means for generating a file, responsive to the datalog, wherein the test response data are reformatted into the design pattern format, defining reformatted test response data;
    means for identifying the reformatted test response data as one or more failure signals comprising reformatted test response outputs for pins of the integrated circuit; and
    means for substituting failure indications for one or more of the reformatted test response outputs.

9. The system of claim 8 further including means for combining the file and the design pattern to form a debug file.

10. The system of claim 9 wherein the means for generating a datalog further comprises means for generating one or more further failure signals comprising the failure signals having failure indications substituted for one or more of the reformatted test response outputs.

11. The system of claim 9 further including means for altering the design pattern to reformat design response data associated with failure indications.

12. A computer program product tangibly stored on a computer-readable medium that contains a program to debug an integrated circuit, said computer product comprising:

computer code to retrieve data from a design data base, and create a design pattern in a pattern format, which design pattern includes stimulus data for stimuli to be applied to the integrated circuit and design response data for expected responses to the stimuli;

code to generate, responsive to the design pattern, a tester pattern and a test program for input to a tester;

code to test the integrated circuit in the tester, responsive to the tester pattern and the test program, and to generate a datalog that comprises test response data; and code to generate a file, responsive to the datalog, wherein the test response data are reformatted into the pattern format.

13. The computer program product as recited in claim 12 wherein said code to test further includes a subroutine to identify the reformatted test response data as one or more failure signals comprising reformatted test response outputs for pins of the integrated circuit.

14. The computer program product as recited in claim 13 wherein said code to test further includes an additional subroutine to substitute failure indications for one or more of the reformatted test response outputs.

15. The computer program product as recited in claim 13 wherein said code to test further includes an additional subroutine to generate one or more further failure signals comprising the failure signals having failure indications substituted for one or more of the reformatted test response outputs.

16. The computer program product as recited in claim 15 further including code, responsive to the design pattern and the file, to combine the file and the design pattern to form a debug file.

17. The computer program product as recited in claim 16 further including code, responsive to the design pattern and the file, to alter the design pattern to reformat design response data associated with failure indications.

* * * * *